United States Patent

[11] 3,617,918

| [72] | Inventor | Herbert Rabin<br>Bethesda, Md. |
|---|---|---|
| [21] | Appl. No. | 856,294 |
| [22] | Filed | Sept. 9, 1969 |
| [45] | Patented | Nov. 2, 1971 |
| [73] | Assignee | The United States of America as represented by the Secretary of the Navy |

[54] RAPID FREQUENCY SCANNING OF TEMPERATURE TUNED OPTICAL PARAMETRIC OSCILLATORS
5 Claims, No Drawings

[52] U.S. Cl................................................ 330/4.3, 350/160
[51] Int. Cl........................................ H01s 3/00, H01s 3/10
[50] Field of Search............................................ 250/47; 331/94.5; 350/160; 330/43

[56] References Cited
UNITED STATES PATENTS
3,315,177  4/1967  Benson.......................... 331/94.5

FOREIGN PATENTS
926,796  5/1963  Great Britain............... 350/160

Primary Examiner—Rodney D. Bennett, Jr.
Assistant Examiner—N. Moskowitz
Attorneys—R. I. Tompkins, Arthur L. Branning, R. J. Erickson and M. L. Crane ABSTRACT: This disclosure is directed to a means and method of changing the operating frequency of optical parametric amplifiers or oscillators over a wide range of frequencies by establishing a thermal gradient in a nonlinear crystal such as lithium niobate or barium-sodium niobate compositions of matter.

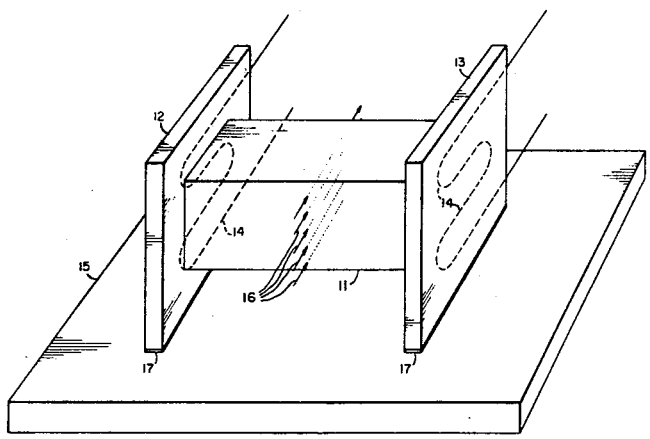

PATENTED NOV 2 1971  3,617,918

INVENTOR
HERBERT RABIN

BY *Melvin L. Crane* AGENT
*Arthur L. Branning* ATTORNEY

3,617,918

RAPID FREQUENCY SCANNING OF TEMPERATURE TUNED OPTICAL PARAMETRIC OSCILLATORS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to laser systems and more particularly to a nonlinear crystal and method of changing the frequency of the laser output.

Heretofore, nonlinear crystals have been used for shifting the frequency of laser radiation by so-called parametric processes. Such systems have been described in the published literature in the following articles (1) "Infrared Laser Output Up-Converted by New Nonlinear Crystal to High-Power, C–W Green Light," LASER FOCUS, Feb. 1968, pages 16–18; (2) "Tunable Parametric Oscillator Produces Coherent Green Light From Infrared Laser Source," LASER FOCUS, June 1968, pages 16–18; (3) "Continuous 0.532 of Solid-State Service Using $Ba_2NaNb_5O_{15}$" by J. E. Gusic et al. Applied Physics Letters, Vol. 12, 09, 1 May 1968, pages 306–307; (4) "Continuous Optical Parametric Oscillation In $Ba_2NaNb_5O_{15}$" by R. A. Smith et al. Applied Physics Letters, Vol. 12, 09, 1 May 1968, pages 308–310. These articles reference many other articles. Other laser articles are noted in the following U.S. Pat. No. 3,262,058, 3,289,100 and 3,328,723 which are directed to nonlinear niobate materials. Parametric oscillators provide means for spectral tuning of laser radiation and the efficiency of the conversion is dependent on momentum matching in the nonlinear crystal. In order to achieve momentum matching, nonlinear crystals such as the niobates are temperature tuned, i.e. adjustment of the temperature of the crystal to some specified value results in the desired momentum matching condition for conversion of laser frequency to some other particular spectral frequency output. Changing the temperature to some other value, thus, produces momentum matching at some other frequency, and accordingly tuned spectral output is attained by adjusting the temperature of the entire nonlinear crystal.

SUMMARY OF THE INVENTION

This invention provides a nonlinear crystal across which a thermal gradient is established which is maintained constant, for example, by end blocks at temperatures $T_1$ and $T_2$, respectively. The crystal is positioned such that the laser pump beam passes through the crystal at or near perpendicular to the thermal gradient. By shifting the position at which the laser beam passes through the crystal, a continuous range of crystal temperatures from approximately $T_1$ to $T_2$ is encountered. Thus, by shifting either the laser beam or the crystal along a line through the crystal perpendicular to the end plates, any spectral output compatible with the bandwith corresponding to the temperature range $T_1$ to $T_2$ can be obtained. Thus, the same crystal can be used for instantaneously changing the frequency output of a laser beam without having to wait for the crystal to cool down or heat up to a constant temperature throughout the entire crystal. By moving either the crystal or laser beam, the entire frequency output range between $T_1$ and $T_2$ may be continuously changed, if desired, without any delay associated with the thermal inertia of the crystal.

STATEMENT OF THE OBJECTS

It is therefore an object of the present invention to provide a means and method of rapidly changing the output frequency of a laser beam.

Another object is to enable one to select a frequency output over a set range of frequencies, with the ability to instantly change to any other frequency within the range of frequencies.

Still another object is to provide a simple means by which a laser beam may be changed to a plurality of different frequencies. Conversely, the absence of an output can be achieved by the use of apertures in front of the crystal, by moving the laser beam out of the crystal, or by moving it into a region of the crystal which is not phase matched.

Other and more specific objects of the invention will become apparent upon a careful consideration of the following detailed description when taken together with the accompanying drawing.

DETAILED DESCRIPTION OF THE INVENTION

Figure 1:
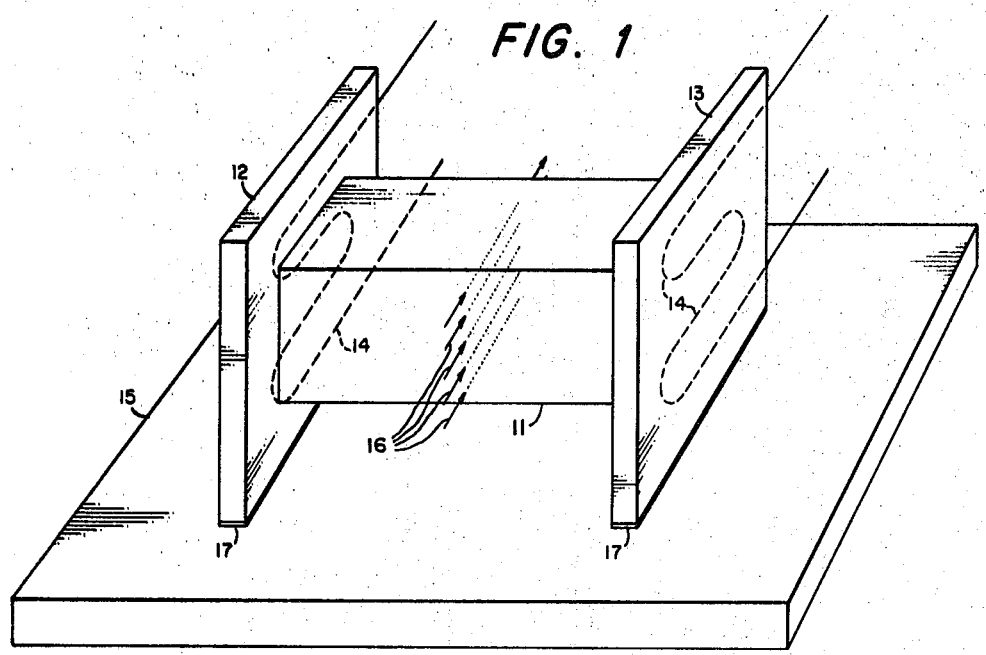
FIG. 1 illustrates a nonlinear crystal with end plates at temperature $T_1$ and $T_2$.

Now referring to the drawing, there is shown by illustration in FIG. 1, a nonlinear crystal 11, such as lithium niobate or barium sodium niobate, which is supported by a heat conductive block 12 secured at one end and a heat conductive block 13 secured at the opposite end. The nonlinear crystal is secured to the heat conductive blocks such that heat is readily transferred from each of the blocks to the nonlinear crystal to provide a thermal gradient across the crystal perpendicular to the blocks such that the end of the crystal secured to one block is at a lower temperature than the end of the block secured to the other end block. Thus, the temperature across the width and thickness of the crystal along a plane parallel to the end blocks is at the same temperature. The end blocks are so arranged and provided with a heat transfer means such as an electric heater 14 (shown in dotted line) embedded within the end blocks such that the end blocks are maintained at a constant temperature while maintaining the temperature gradient at a constant temperature difference along the length of the crystal between the end blocks. The end blocks may be secured to a movable platform 15, as shown, in order to move the crystal horizontally with respect to an incident laser pump beam 16 which is incident on the crystal perpendicular to the thermal gradient and normal to a side. The end blocks are separated from the platform by a heat resistant insulator 17 to avoid heat transfer to the platform. On use, the laser beam may be moved relative to a stationary crystal for the same results. Clearly, other mechanical assemblies are possible for achieving the same purpose.

Figure 2:
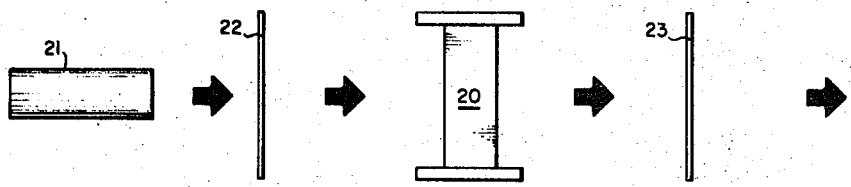
FIG. 2 illustrates the top view of a laser system including the crystal of FIG. 1.
Figure 3:
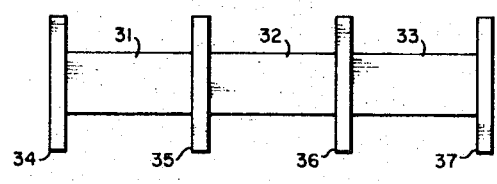
FIG. 3 illustrates a plurality of crystals in an assembly.

FIG. 2 illustrates the nonlinear crystal used in conjunction with a laser system. As shown, a nonlinear crystal assembly 20, such as described in FIG. 1, is positioned to receive the laser pump beam, produced by a laser 21, which passes through the crystal perpendicular to the thermal gradient. The crystal is contained within a resonant cavity comprising mirrors 22 and 23 through which the laser pump beam passes.

It has been set forth in the prior art that a laser pump beam passing through a nonlinear crystal is changed to a different frequency and that by changing the temperature to a new and different temperature, an output beam of a different frequency will result. Therefore, with the nonlinear crystal secured to a movable platform or any other suitable means which moves the crystal along a horizontal line in the direction of the temperature gradient (such as piezoelectric elements), the laser pump beam will be incident on different sections of the crystal maintained at a different temperature. Thus, movement of the crystal produces a variable frequency output because the laser pump beam will pass through different regions having different temperatures.

Thus, the thermal gradient existing in the nonlinear crystal allows for a much more rapid scan of the tunable frequency output of the parametric oscillator. In the above described system, the thermal gradient is established corresponding to a predetermined spectral bandwidth of the device. It is then only necessary to adjust the position of the crystal through which the laser beam passes. This change can be brought about by rapid mechanical scan of the crystal and crystal holder assembly, or by rapid scan of the laser beam by use of any suitable means such as with mirrors or other optical elements or electro-optical control of the beam. It is recognized that movement may be made in either direction; therefore, it is possible to pump between a series of discrete frequencies in any prescribed direction, i.e. higher or lower frequencies. Since the temperature gradient remains fixed across the crystal, constant changes of the temperature of the whole crystal are avoided.

In order to enable one to cover an extreme frequency range different crystals may be sandwiched between an array of heating blocks each maintained at a different temperature in increasing order from one end. Therefore, three different crystals 31, 32, and 33 may be sandwiched between heating blocks 34-37. Other such forms will become obvious to those skilled in the art. Obviously the laser beam will pass through the crystals normal to their sides as described above.

Obviously many modifications and variations of the present invention are possible in the light of the above teachings. It is therefore to be understood that the invention may be practiced otherwise than as specifically described.

What is claimed and desired to be secured by Letters Patent of the United States is.

1. A system for converting the output frequency of a laser to a tunable range of different frequencies, which comprises:
   a laser element,
   a nonlinear crystal,
   means for producing a thermal gradient across said nonlinear crystal,
   said nonlinear crystal positioned relative to said laser element to receive the output of said laser at an angle with respect to the thermal gradient, and
   means for producing relative displacement between said laser and said crystal along a line along the thermal gradient to subject different areas of said crystal having different temperatures to said incident light thereby producing different output frequencies.

2. A laser system as claimed in claim 1; wherein, said nonlinear crystal include only one crystal.

3. A laser system as claimed in claim 1; wherein,
   said nonlinear crystal includes a plurality of crystals sandwiched between separate thermal gradient producing means.

4. An element for converting the fixed output frequency of a laser to a tunable range of different frequencies, which comprises:
   a nonlinear crystal,
   first and second heat transfer means secured to opposite ends of said nonlinear crystal;
   said first heat transfer means operative to maintain a temperature of $T_1$,
   said second heat transfer means operative to maintain a temperature of $T_2$, $T_2$ being different from $T_1$,
   said nonlinear crystal maintained by said first and second heat transfer means in a heat transfer relationship, and
   means for moving said element along a line relative to a laser light beam perpendicular thereto,
   where a temperature gradient between $T_1$ and $T_2$ will be produced uniformly across said crystal with each incremental cross section through said crystal having a different temperature.

5. An element for converting the fixed output frequency of a laser to a tunable range of different frequencies, which comprises:
   a nonlinear crystal,
   first and second heat transfer means secured to opposite ends of said nonlinear crystal,
   said first heat transfer means operative to maintain a temperature of $T_1$,
   said second heat transfer means operative to maintain a temperature of $T_2$, $T_2$ being different from $T_1$,
   said nonlinear crystal maintained by said first and second heat transfer means in a heat transfer relationship, and
   means for moving a laser light beam along a line relative to said element with the light beam perpendicular to said element,
   whereby a temperature gradient between $T_1$ and $T_2$ will be produced uniformly across said crystal with each incremental cross section through said crystal having a different temperature.

* * * * *